US007321727B2

(12) United States Patent
Ng et al.

(10) Patent No.: US 7,321,727 B2
(45) Date of Patent: Jan. 22, 2008

(54) METHOD FOR NETWORK COMMISSIONING USING AMPLIFIED SPONTANEOUS EMISSION (ASE) SOURCES

(75) Inventors: Eddie Kai Ho Ng, Ottawa (CA); Jason Christopher De Rocher, Nepean (CA); Derrick Remedios, Nepean (CA); James Benson Bacque, Ottawa (CA); Ping Wai Wan, Kanata (CA)

(73) Assignee: Tropic Networks Inc., Kanata, Ontario (CA)

( * ) Notice: Subject to any disclaimer, the term of this patent is extended or adjusted under 35 U.S.C. 154(b) by 153 days.

(21) Appl. No.: 11/178,330

(22) Filed: Jul. 12, 2005

(65) Prior Publication Data

US 2006/0023737 A1    Feb. 2, 2006

(51) Int. Cl.
*H04B 10/08* (2006.01)
*H04B 17/00* (2006.01)
(52) U.S. Cl. .............................. 398/21; 398/25; 398/37
(58) Field of Classification Search .................. 398/21, 398/25, 37
See application file for complete search history.

(56) References Cited

U.S. PATENT DOCUMENTS

| 6,008,915 | A | * | 12/1999 | Zyskind ........................ 398/34 |
| 6,009,220 | A | * | 12/1999 | Chan et al. .................... 385/24 |
| 6,519,081 | B2 | | 2/2003 | Lelie et al. |
| 6,519,082 | B2 | * | 2/2003 | Ghera et al. ............. 359/341.4 |
| 6,690,506 | B2 | | 2/2004 | Zahnley et al. |
| 6,928,243 | B2 | * | 8/2005 | Youn et al. .................... 398/33 |
| 2003/0099015 | A1 | * | 5/2003 | Kelly et al. .................. 359/127 |
| 2004/0047628 | A1 | * | 3/2004 | Passier et al. ................. 398/15 |
| 2005/0047781 | A1 | * | 3/2005 | El-Reedy et al. ............. 398/37 |

OTHER PUBLICATIONS

Yoon et al. Reference Level Free Multichannel Gain Equalization and Transient Gain Suppression of EDFA with Differential ASE Power Monitoring. IEEE Photonics Technology Letters, vol. 11, No. 3, Mar. 1999.*
Yoon et al. Link-Control Gain Clamping for a Cascaded EDFAs Link Using Differential ASE Monitor. IEEE Photonics Technology Letters, vol. 12, No. 10, Oct. 2000.*
Sato et al, "Noise Figure Monitoring of Optical Amplifiers via Backward Amplified Spontaneous Emission", IEEE Photonics Technology Letters, vol. 6, No. 2, Feb. 1994, pp. 202-204.

* cited by examiner

*Primary Examiner*—Deandra M. Hughes
(74) *Attorney, Agent, or Firm*—Victoria Donnelly

(57) ABSTRACT

This invention provides a method for commissioning an optical network using internal Automatic Spontaneous Emission (ASE) light inherently present in the optical network as a light source (the ASE light source) for measuring losses inside and between nodes in the network. A modular segmented approach is adopted and the network is commissioned segment by segment. The method uses techniques for the correction of the Optical Signal to Noise Ratio induced error as well as the Spectral Filtering Error during the loss computation required for adjusting the gains of the amplifiers at each network node to an appropriate value. Since the method does not require an external laser source that needs to be moved manually from node to node, it greatly reduces the commissioning time. Since it uses only the existing components of the network nodes it also leads to a significant saving in cost.

23 Claims, 10 Drawing Sheets

METHOD FOR NETWORK COMMISSIONING USING AMPLIFIED SPONTANEOUS EMISSION (ASE) SOURCES

FIELD OF INVENTION

The invention relates to optical communication networks, and in particular to a method for commissioning an optical network using Amplified Spontaneous Emission (ASE) sources.

BACKGROUND OF INVENTION

Commissioning an optical network is an important step in making the network operational after its installation is complete. A node in an optical network contains a number of components such as amplifiers, blockers and attenuators. Fixing the parameters for the different components such as amplifier gains that are estimated during the link planning stage is a major objective for network commissioning. Using an optical signal source at various nodes in the network and making measurements at the output of various components are required to achieve this objective. A removable laser source is typically used in prior art for this purpose. The laser source is attached to a particular node and the resulting signals are then measured at various points in the network. For completing the network installation, however, the laser source needs to be attached to various nodes in the network. One of the major problems with this approach is that the laser source is to be moved manually from one node to another leading to long network commissioning times. Another problem is that, additional hardware is needed, giving rise to extra costs, and additional logistics problems. Thus there is a need in the field for the development of an improved and efficient method for commissioning of an optical network.

SUMMARY OF THE INVENTION

Therefore it is an objective of this invention to devise an efficient method for commissioning optical networks such that the time required for network commissioning is significantly reduced from what is achieved in prior art using a manual method based on a removable laser source.

A method for commissioning an optical network including nodes, comprising the step of commissioning the optical network by using an internal Automatic Spontaneous Emission (ASE) light inherently present in the optical network as a light source (the ASE light source) for measuring losses inside and between the nodes in the network. For example, the optical network may be an optical ring network.

The step of commissioning comprises commissioning a through-path of the optical ring network with N nodes labeled 1 to N, the method comprising steps of: verifying a node installation using the internal ASE light source for measuring losses inside the node; preparing for node commissioning; commissioning nodes using the internal ASE light source for measuring losses inside and between the nodes; and checking commissioning of nodes wherein the optical ring network contains segments, each segment including two adjacent nodes in said network.

Each node includes a demultiplexer, an ingress amplifier, an egress amplifier, a blocker, a coupler and a multiplexer.

The step of verifying the node installation comprises the steps of: setting the ingress amplifier to constant power mode; setting the blocker to pass all channels; measuring DC losses between cards in said node; comparing measured losses with losses provided by a Link Planning Tool (LPT); setting the blocker to pass one channel at a time; and verifying per channel control.

The step of preparing for node commissioning comprises the steps of: setting all blockers to block; downloading LPT target values; and setting the ingress amplifiers and the egress amplifiers at a minimum gain specified in the LPT.

The step of commissioning nodes comprises the steps of: commissioning Segment 1; commissioning Segment "i"; and commissioning Segment N; wherein the Segment 1 includes Node 1 and Node 2, the Segment "i" includes Node "i" and Node "i+1" and the Segment N includes Node N and Node 1, and "i" is greater than 1 but less than N and is incremented in steps of 1.

The step of checking commissioning of nodes comprises the steps of: reconciling a ring loss and a gain with the LPT; producing a pass/fail margin report; replacing a faulty component with an excess loss; and rerunning commissioning procedure after failure is fixed.

The step of commissioning the Segment 1 further comprises the steps of: setting the ingress amplifier of Node 1 to constant power mode for making said ingress amplifier the ASE light source; setting all channels in the blocker in Node 1 to pass-through; adjusting gain of the egress amplifier on Node 1; adjusting gain of the ingress amplifier on Node 2; setting the ingress amplifier on Node 1 to a constant gain mode; and setting all channels in the blocker in Node 1 to block.

The step of commissioning the Segment "i" further comprises the steps of: setting the ingress amplifier of Node "i" to constant power mode for making said ingress amplifier the ASE light source; setting all channels in the blocker in Node "i" to pass-through; adjusting gain of the egress amplifier on Node "i"; adjusting gain of the ingress amplifier on Node "i+1" that is next to Node "i" in the optical ring network; setting the ingress amplifier on Node "i" to constant gain mode; and setting all channels in the blocker in Node "i" to block.

The step of commissioning the Segment N further comprises the steps of:

setting the ingress amplifier of Node N to constant power mode for making the said ingress amplifier the ASE light source; setting all channels in the blocker in Node N to pass-through; adjusting gain of the egress amplifier on Node N; adjusting gain of the ingress amplifier on Node 1; setting the ingress amplifier on Node N to constant gain mode; and setting all channels in the blocker in Node N to block.

The step of adjusting the gain of the egress amplifier on Node 1 further comprises the step of measuring associated losses and setting the gain of the egress amplifier on Node 1 to a value that compensates for these losses.

The step of adjusting the gain of the ingress amplifier on Node 2 further comprises the step of measuring associated losses and setting the gain of the ingress amplifier on Node 2 to a value that compensates for these losses.

The step of adjusting the gain of the egress amplifier on Node "i" further comprises the step of measuring associated losses and setting the gain of the egress amplifier on Node "i" to a value that compensates for these losses.

The step of adjusting the gain of the ingress amplifier on Node "i+1" further comprises the step of measuring associated losses and setting the gain of the ingress amplifier on node next to Node "i" on the optical ring network to a value that compensates for these losses.

The step of adjusting the gain of the egress amplifier on Node N further comprises the step of measuring associated losses and setting the gain of the egress amplifier on Node N to a value that compensates for these losses.

The step of adjusting the gain of the ingress amplifier on Node 1 further comprises the step of measuring associated losses and setting the gain of the ingress amplifier on Node 1 to a value that compensates for these losses.

The step of measuring associated losses and setting the gain of the egress amplifier on Node 1 further comprises the step of correcting the OSNR (Optical Signal to Noise Ratio) induced error as well as a Spectral Filtering error.

The step of measuring associated losses and setting the gain of the ingress amplifier on Node 2 further comprises the step of correcting the OSNR (Optical Signal to Noise Ratio) induced error as well as the Spectral Filtering error.

The step of measuring associated losses and setting the gain of the egress amplifier on Node "i" further comprises the step of correcting the OSNR (Optical Signal to Noise Ratio) induced error as well as the Spectral Filtering error.

The step of measuring associated losses and setting the gain of the ingress amplifier on Node "i+1" on the optical ring network further comprises the step of correcting the OSNR (Optical Signal to Noise Ratio) induced error as well as the Spectral Filtering error.

The step of measuring associated losses and setting the gain of the egress amplifier on Node N further comprises the step of correcting the OSNR (Optical Signal to Noise Ratio) induced error as well as the Spectral Filtering error.

The step of measuring associated losses and setting the gain of the ingress amplifier on Node 1 further comprises the step of correcting the OSNR (Optical Signal to Noise Ratio) induced error as well as the Spectral Filtering error.

The blocker in a node is a Reconfigurable Optical Add Drop Multiplexer (ROADM) configured to be a blocker.

Preferably, the through-path of an optical ring network is commissioned according to the method for commissioning an optical network using an ASE.

A segment of an optical ring network is commissioned according to the method wherein the optical ring network contains segments, each segment including two adjacent nodes in the network.

An optical network is commissioned according to the method for commissioning an optical network including nodes described herein.

A method for commissioning a segment of an optical network including two adjacent nodes, comprising commissioning the segment by using an internal Automatic Spontaneous Emission (ASE) light inherently present in the optical network as a light source (the ASE light source) for measuring losses inside and between said nodes.

Beneficially, the segment of an optical network is commissioned according to the method for commissioning a segment of the optical network.

BRIEF DESCRIPTION OF THE DRAWINGS

Further features and advantages of the invention will be apparent from the following description of the embodiment, which is described by way of example only and with reference to the accompanying drawings in which.

DETAILED DESCRIPTION OF THE EMBODIMENT OF THE INVENTION

By way of example, the embodiment of the invention illustrates the commissioning of the through-path in an optical ring network and is described in this section.

Figure 1:
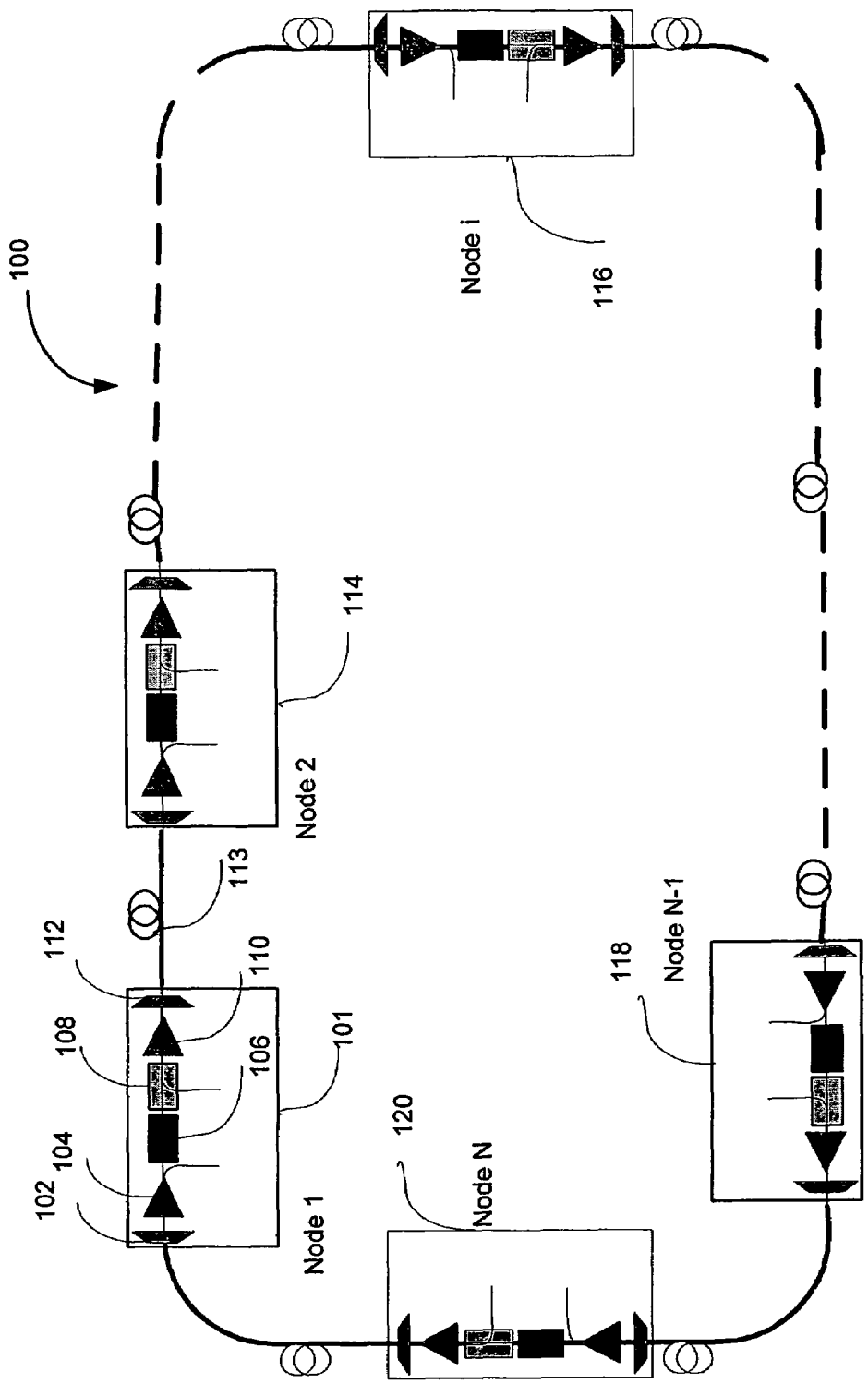
FIG. 1 presents a ring optical network with N nodes.

An example optical ring network 100 with N nodes is presented in FIG. 1. The figure displays Node 1, 101, Node 2 114, Node i 116, Node N-1 118, and Node N 120 that are organized in the form of a ring. Each node has a number of optical components. Node 1 for example, has a demultiplexer 102, an ingress amplifier 104, a blocker 106, a coupler 108, an egress amplifier 110 and a multiplexer 112. The input for the node arrives at the input of the demultiplexer 102. The blocker 106 may be achieved by an appropriately configured Reconfigurable Optical Add Drop Multiplexer (ROADM). The output of the demultiplexer 102 is connected to the input of the ingress amplifier 104, the output of which is connected to the input of the blocker 106. The output of the blocker 106 is connected to the input of the coupler 108, the output of which is connected to the input of the egress amplifier 110. The output of the egress amplifier 110 is connected to the input of the multiplexer 112 the output of which is connected to a network span 113 that carries the output optical signal from Node 1 (101) to the input of the next node, Node 2 (114). The output of any Node i ($2 \leq i < N$) 116 is carried through a network to the input of Node i+1. In order to maintain a ring configuration, the output of Node N 120 is presented by a network span to the input of Node 1 101.

One of the important attributes of the invention is to avoid the need of the external laser source traditionally used in prior art for commissioning optical networks. This is achieved by operating the ingress amplifier of a given node in the constant power mode and using the noise generated due to automatic spontaneous emission (ASE) light inherently present in the optical network as a light source (the ASE light source) to replace the external laser source used in prior art during node commissioning for measuring losses inside and between the nodes in the network. Computation of the losses introduced by the network and setting the gains of the amplifiers in the nodes appropriately for offsetting these losses are performed during the node commissioning. Two types of errors need to be considered during loss computations: Optical Signal to Noise Ratio (OSNR) induced error and Spectral Filtering Error. Each of these as well as the correction mechanisms employed by the invention are briefly described.

Additional ASE noise from intermediate constant gain mode amplifiers gives rise to the OSNR induced error. The error and the mechanism used for its correction are explained with the help of FIG. 2 that presents a sequence of amplifiers $A_1$ 202, $A_2$ 204 and $A_3$ 206. The input and output signal associated with an amplifier $A_i$ ($1 \leq i \leq 3$) are designated by $Pin_i$ and $Pout_i$ respectively. The output of an amplifier is connected to the input of the next amplifier in the sequence. $L_0$ is the loss incurred by the signal $P_0$ when it arrives at the input of $A_1$ 202. Similarly L, is the loss incurred by Pout, when it arrives at the input of $A_2$ 204 and $L_2$ is the loss incurred by $Pout_2$ when it arrives at the input of $A_3$ 206. If the amplifiers were ideal amplifiers and did not induce any noise $L_0$ could be computed as:

$$L_0 = P_0 - (Pout_1 - G_1)$$

where $G_1$ is the gain of amplifier $A_1$ 202.

However, with a real optical amplifier such as $A_1$ that gives rise to noise during amplification:

$$Pout_1 = Pin_1 + G_1 + N_1$$

where $N_1$ is the noise induced by $A_1$ 202.

In order to obtain the correct value of $L_0$, the invention uses the Psig signal provided by the amplifier. In response to a query sent to $A_1$ for example, the power reading $Psig_1$ is provided by the amplifier. $Psig_1$ is the power at the amplifier without the added noise. The correct value of $L_0$ is thus obtained as:

$$L_0 = P_0 - (Psig_1 - G_1)$$

Figure 2:
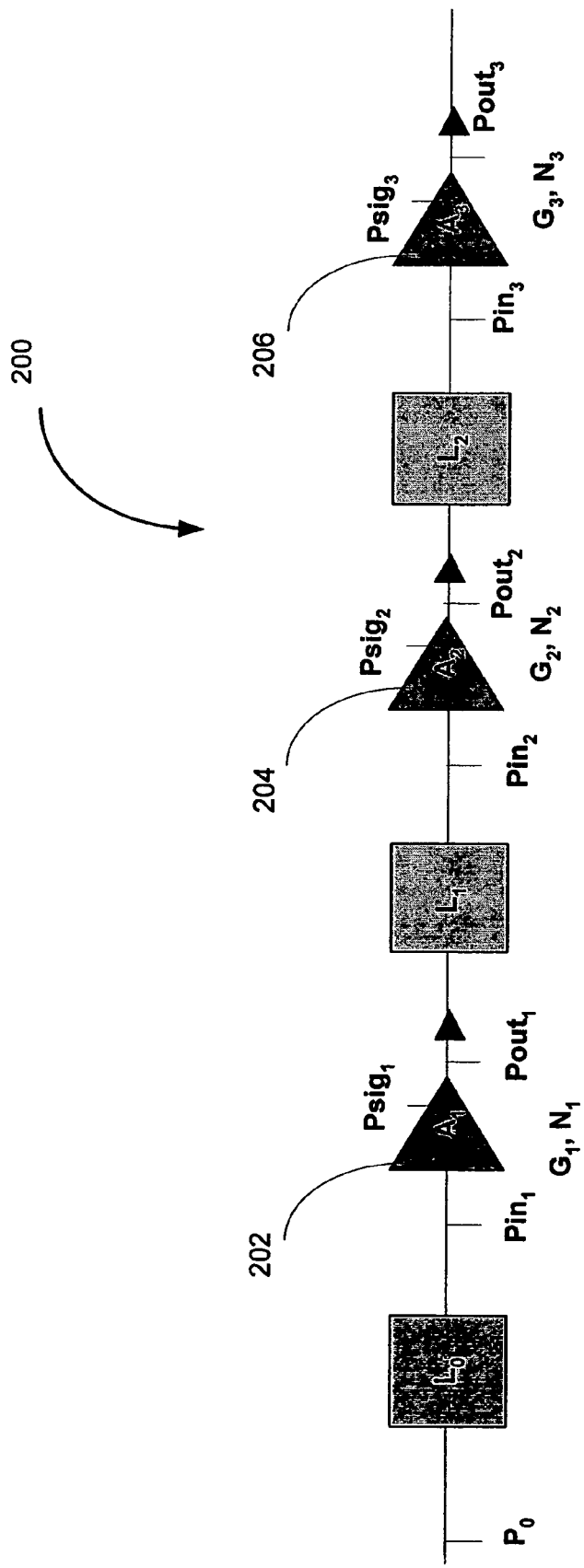
FIG. 2 displays a sequence of three amplifiers for illustrating errors to be considered during loss computations in the network of FIG. 2.

Similarly the correct values of $L_1$ and $L_2$ in FIG. 2 are computed in the current invention by using the $Psig_2$ value for $A_2$ 204 and the $Psig_3$ value for $A_3$ 206 respectively:

$$L_1 = Pout_1 - (Psig_2 - G_2)$$

$$L_2 = Pout_2 - (Psig_3 - G_3)$$

where $G_2$ and $G_3$ are the gains of amplifier $A_2$ 204 and $A_3$ 206 respectively.

Figure 3:
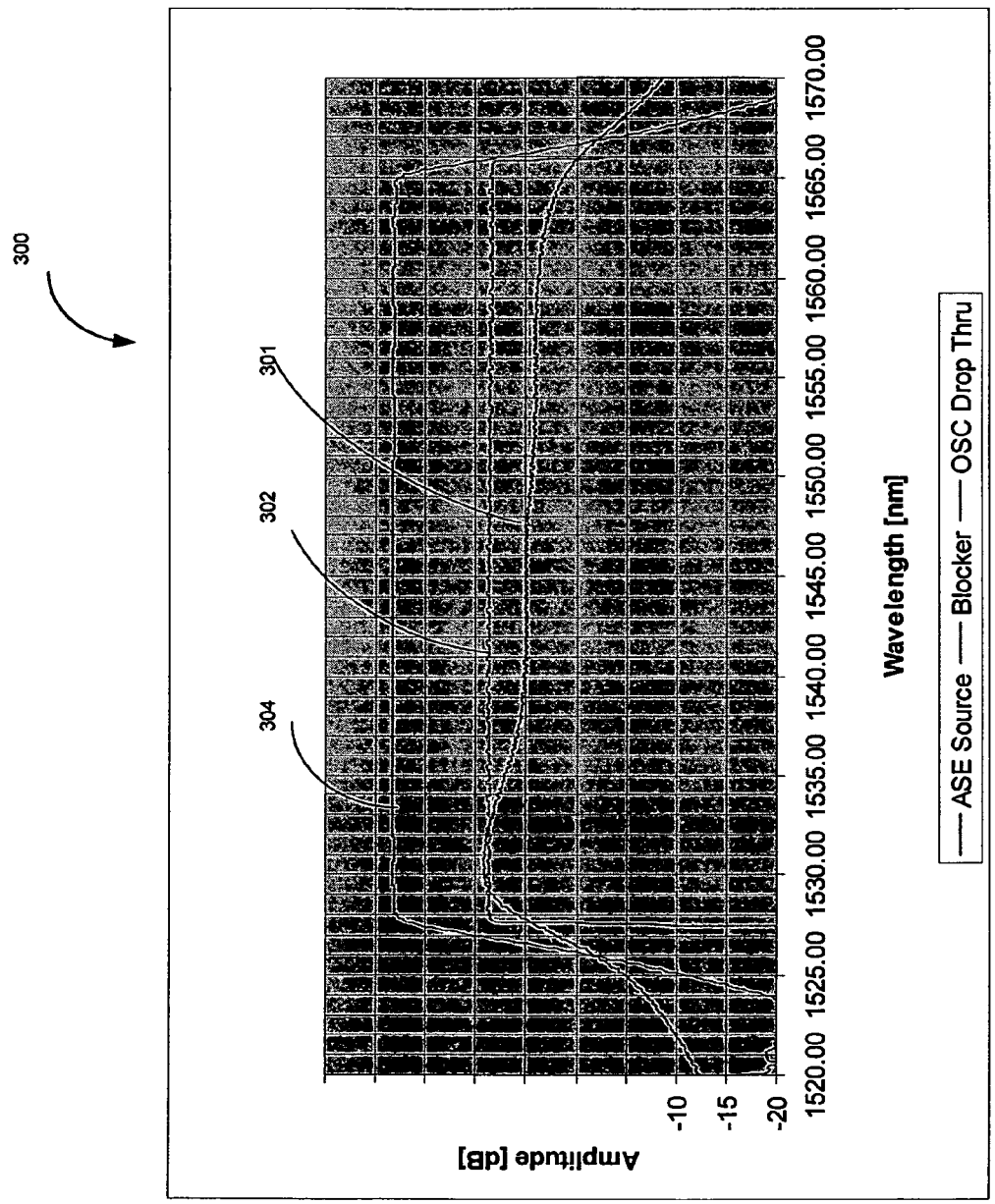
FIG. 3 presents a Spectral Filtering Error and a mechanism for its correction.

The Spectral Filtering Error and the mechanism for its correction are explained with the help of FIG. 3. Example spectral profiles of the ASE source 301, the blocker 302 and an Optical Supervisory Channel (OSC) 304 are displayed in this figure. Note that the wavelength range corresponding to the blocker or the OSC does not overlap entirely with that of the ASE device. Thus making measurements using the output of the ASE source in place of a client signal introduces an error called the Spectral Filtering Error. This error corresponding to the blocker, for example, is a function of the ASE noise spectrum and relative blocker and C-band filter bandwidth. The Spectral Filtering Error correction for the blocker is achieved in the current invention by computing the area in the region not included in the spectral profile corresponding to the blocker but included in the spectral profile for the ASE source, and taking it out during loss computations. The Spectral Filtering Error correction for the OSC can be performed in a similar way.

The optical ring network is composed of segments each of which includes two adjacent nodes. Segment 1 includes Node 1 and Node 2 whereas Segment N includes Node N and Node 1. Any intermediate Segment i includes Node i and Node i+1. The network is commissioned segment by segment. The commissioning of a segment is concerned with the commissioning of the nodes in that segment. The method for network commissioning provided by this invention is explained with the flowchart 400 presented in FIG. 4. Upon start (box 402) the procedure verifies the installation of the nodes in the optical ring network (box 404). The procedure then prepares for node commissioning (box 406). Segment 1 is commissioned first (box 407). In order to commission the remaining N-1 segments, a loop counter variable i is set to 2 (box 408). Segment i is commissioned next (box 410). To move its focus to the next node, the procedure increments the loop counter variable i by 1 (box 412) and checks the value of i (box 414). If i is equal to N the procedure exits 'Yes' from box 414 and commissions Segment N (box 416). The procedure checks the commissioning of the nodes (box 418) and exits (box 420). If the value of i checked in box 414 is less than N the procedure exits 'No' from box 414 and loops back to the entry of box 410.

The step of verifying the installation (box 404 in FIG. 4) requires the verification of installation at each node. The verification of installation at each node is explained further with the flowchart 500 presented in FIG. 5. Upon start the procedure sets the ingress amplifier of the node to a constant power mode (box 504) such that it behaves as an ASE source. The blocker is set to pass all channels (box 506). The procedure measures the DC losses between the cards (box 508) and compares these losses with the expected losses (box 510) provided by the Link Planning Tool (LPT). The blocker is then set to pass one channel at a time (box 512) and the effectiveness of per channel control is verified (box 514). Once the verification is complete the procedure exits (box 516). Departure of the measured characteristics from the expected values may lead to the replacement of the appropriate components.

Figure 4:
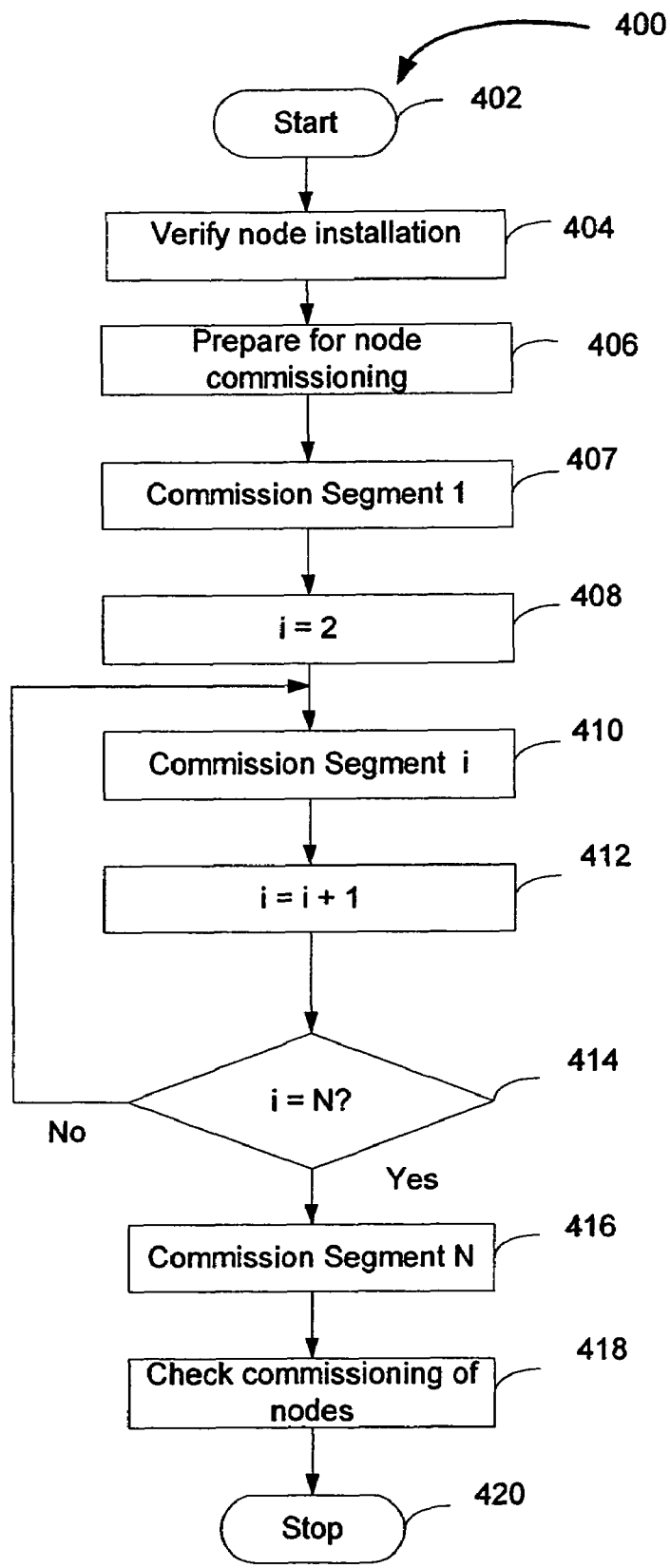
FIG. 4 presents the steps of the method for commissioning the optical network of FIG. 1.
Figure 5:
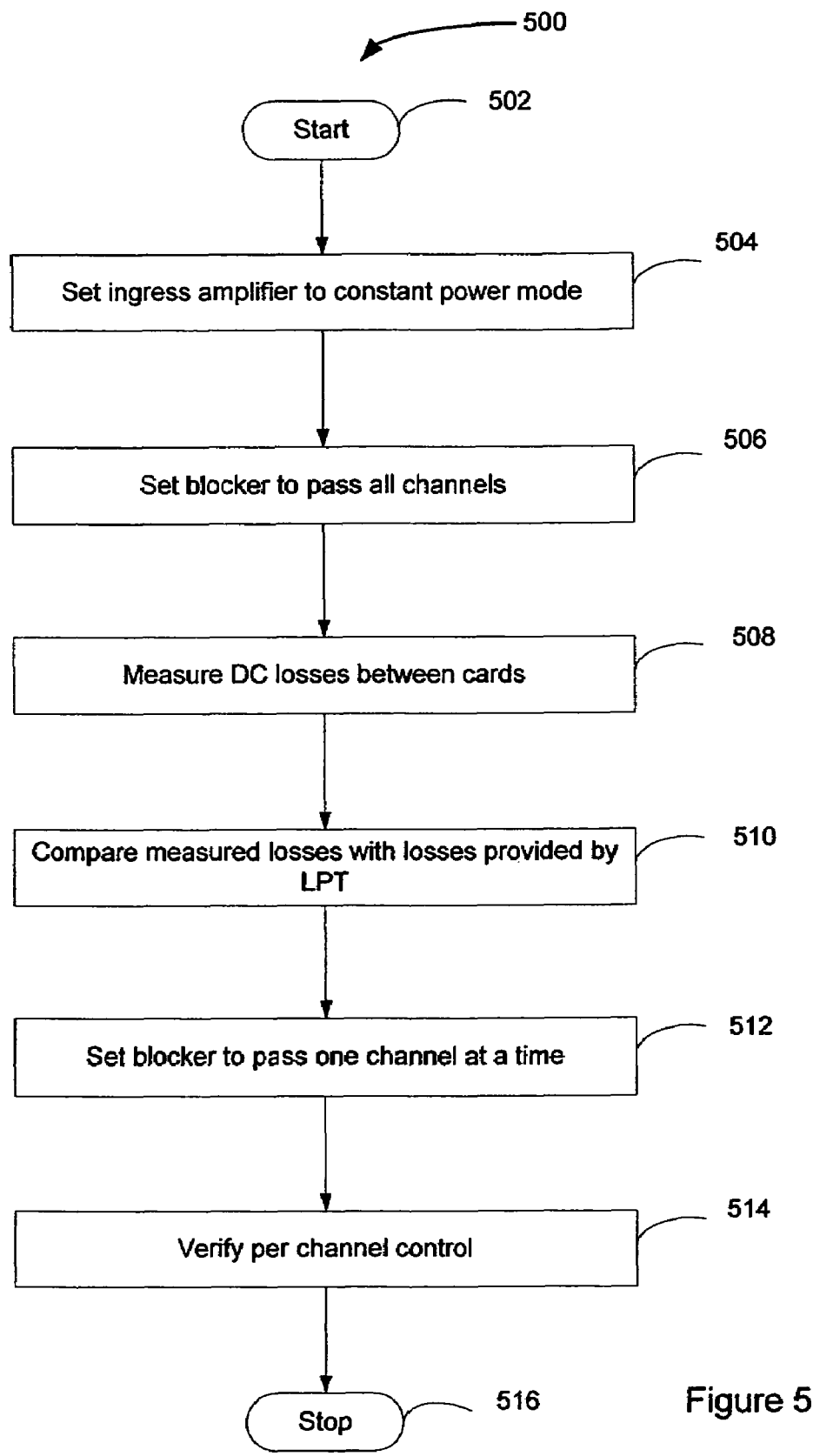
FIG. 5 presents a flowchart for explaining step 404 in FIG. 4.
Figure 6:
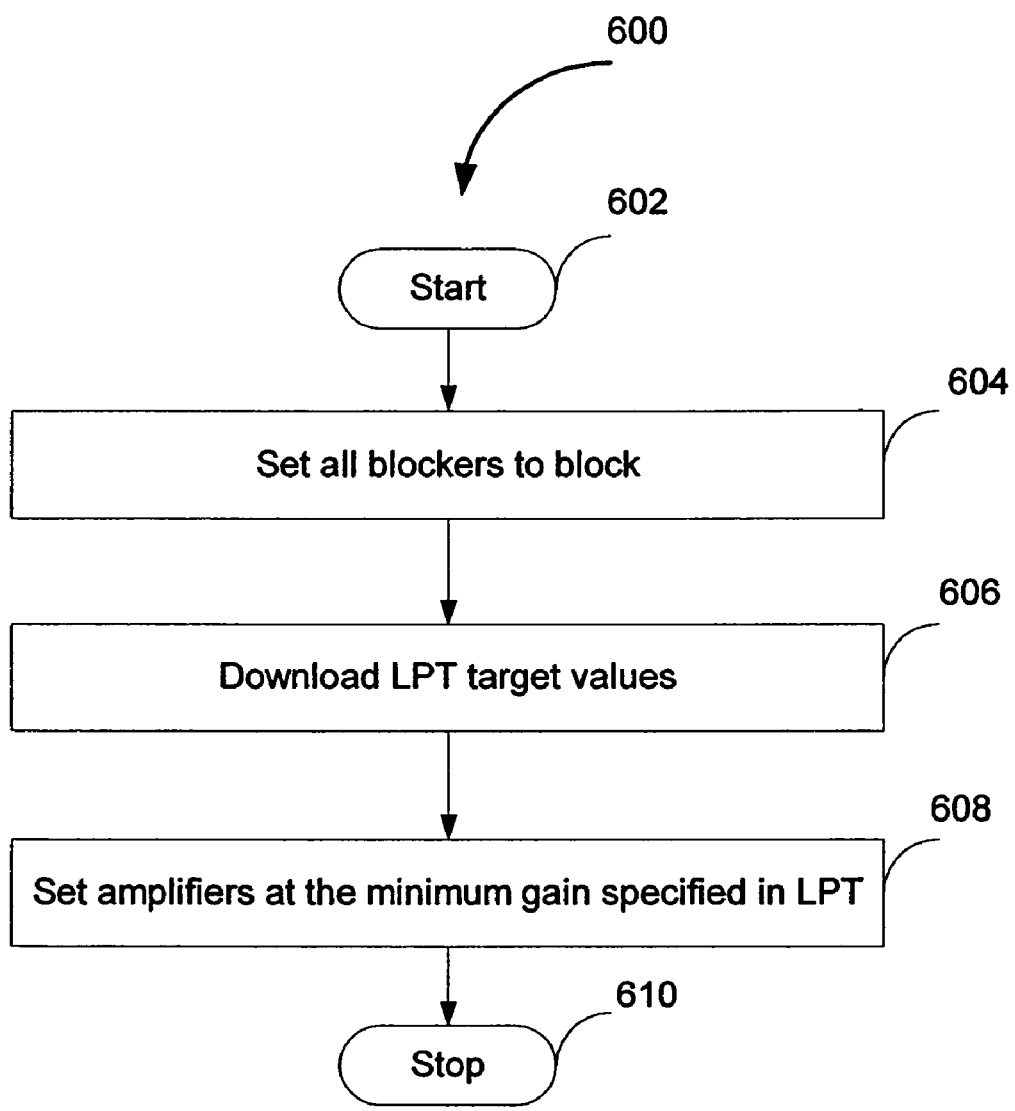
FIG. 6 presents a flowchart for explaining step 406 in FIG. 4.

The step of preparing for node commissioning (box 406) of FIG. 4 is explained further with the flowchart 600 presented in FIG. 6. Upon start the procedure sets all the blockers in all the nodes to block (box 604). The target values to be set for the various characteristics of the components are then downloaded from the LPT to the Network Elements via the Element Management System (box 606). The LPT provides a range for each amplifier gain. As an initialization step, the procedure sets the gain of each amplifier at the minimum value of the range (box 610) and exits (box 610).

Figure 7:
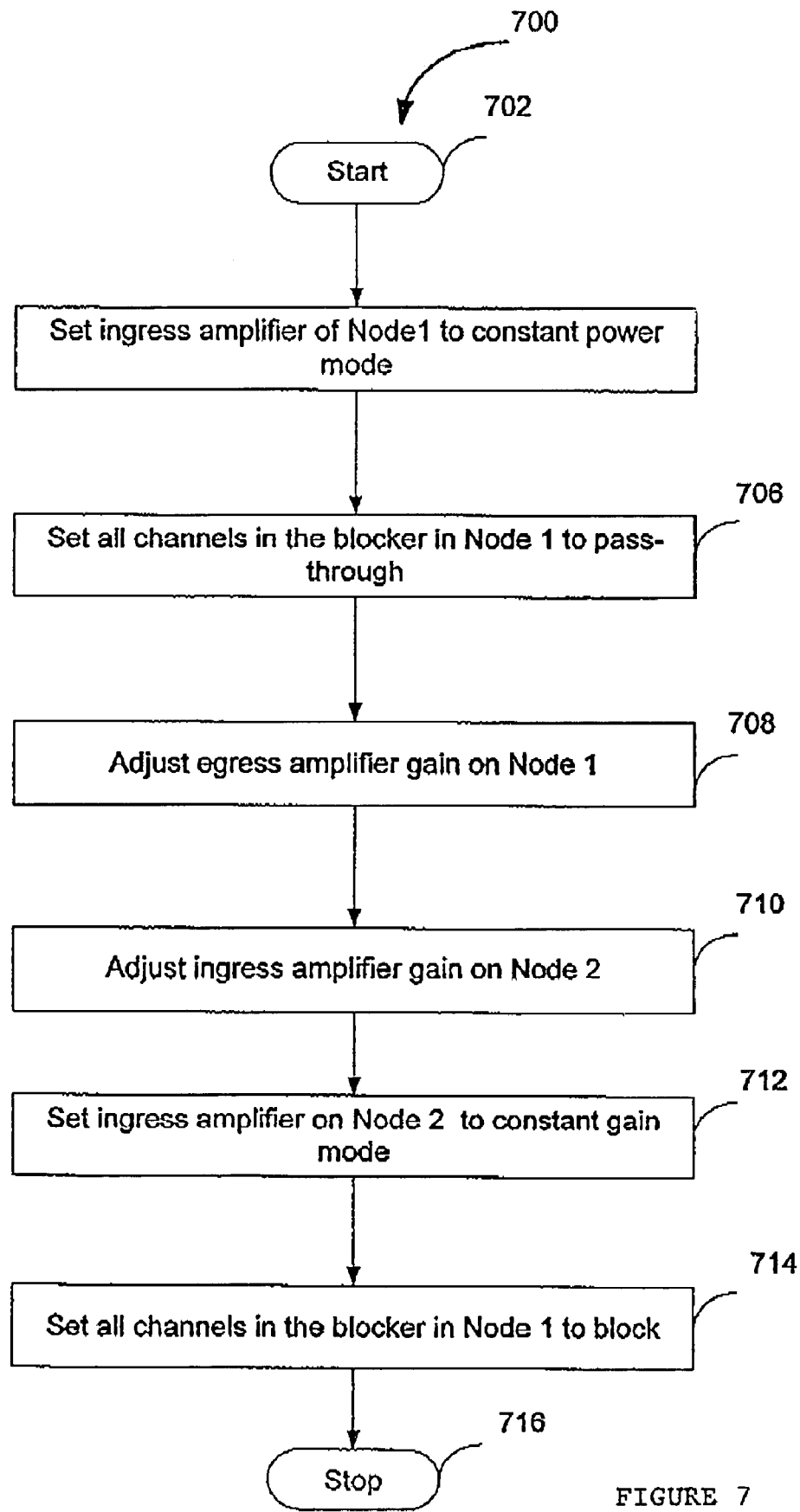
FIG. 7 presents a flowchart for explaining step 407 in FIG. 4.

As shown in FIG. 4, Segment 1 to Segment N in the optical ring network are commissioned next. The commissioning of Segment 1 (box 407 in FIG. 4) is explained with the help of the flowchart 700 in FIG. 7. Upon start (box 702) the procedure sets the ingress amplifier of Node 1 to the constant power mode (box 704) such that it behaves as an ASE source. All the channels in the blocker in the node are then set to pass-through (box 706) such that none of the channels is blocked. The procedure then triggers the egress amplifier adjust of Node 1 using DC powers. The gain of this egress amplifier is thus adjusted (box 708). The ingress amplifier adjust of Node 2 is triggered next for adjusting the gain of this ingress amplifier (box 710). The triggering of the amplifier adjust requires the measurement of the associated losses and the setting of the gain of the appropriate amplifier to a value that compensates for these losses. The techniques for correcting the OSNR induced error as well as the Spectral Filtering error are used by the procedure during the loss computations. The ingress amplifier of Node 1 is set to the constant gain mode (box 712). The procedure then sets all channels in the blocker in Node 1 to block (box 714) and exits (box 716). Note that the gain of the ingress amplifier is set during the commissioning of Segment N.

Figure 8:
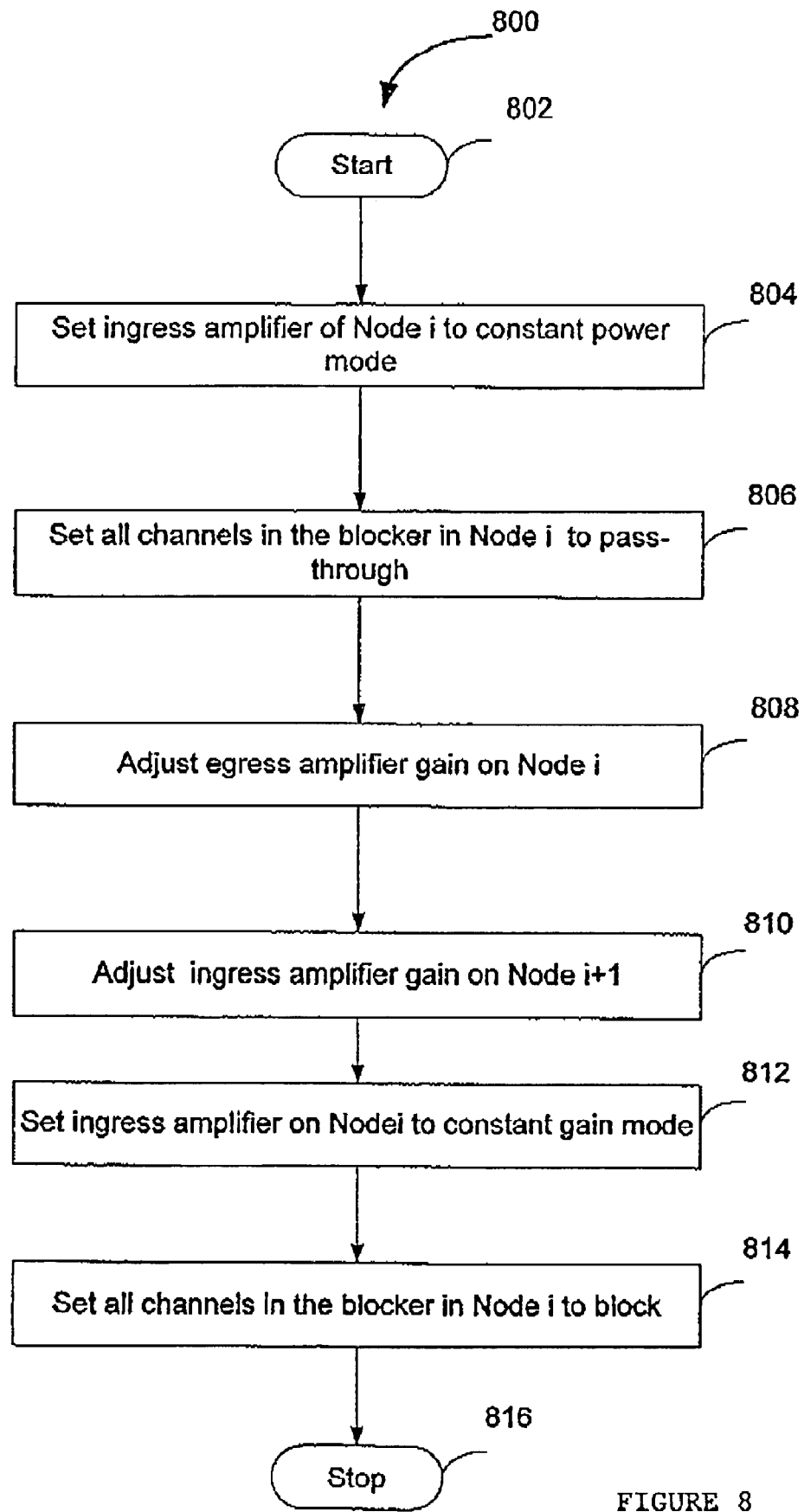
FIG. 8 presents a flowchart for explaining step 410 in FIG. 4.

The step of commissioning of any Segment i ($2 \leq i < N$) in the network (box 410 of FIG. 4) is explained with the help of flowchart 800 presented in FIG. 8. The gain of the ingress amplifier in Node 1 was already set during the commissioning of Segment i-1. Upon start (box 802) the procedure sets the ingress amplifier of Node i to the constant power mode (box 804) such that it behaves as an ASE source. All the channels in the blocker in the node are then set to pass-through (box 806) such that none of the channels is blocked.

The procedure then triggers the egress amplifier adjust of Node i by using DC powers. The gain of this egress amplifier is thus adjusted (box 808). The ingress amplifier adjust is triggered on Node i+1 next for adjusting the gain of this ingress amplifier (box 810). As discussed in the previous paragraph, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. Since the commissioning of Node i is completed its ingress amplifier is set to the constant gain mode (box 812). The procedure sets all channels in the blocker in Node i to block (box 814) and exits (box 816).

Figure 9:
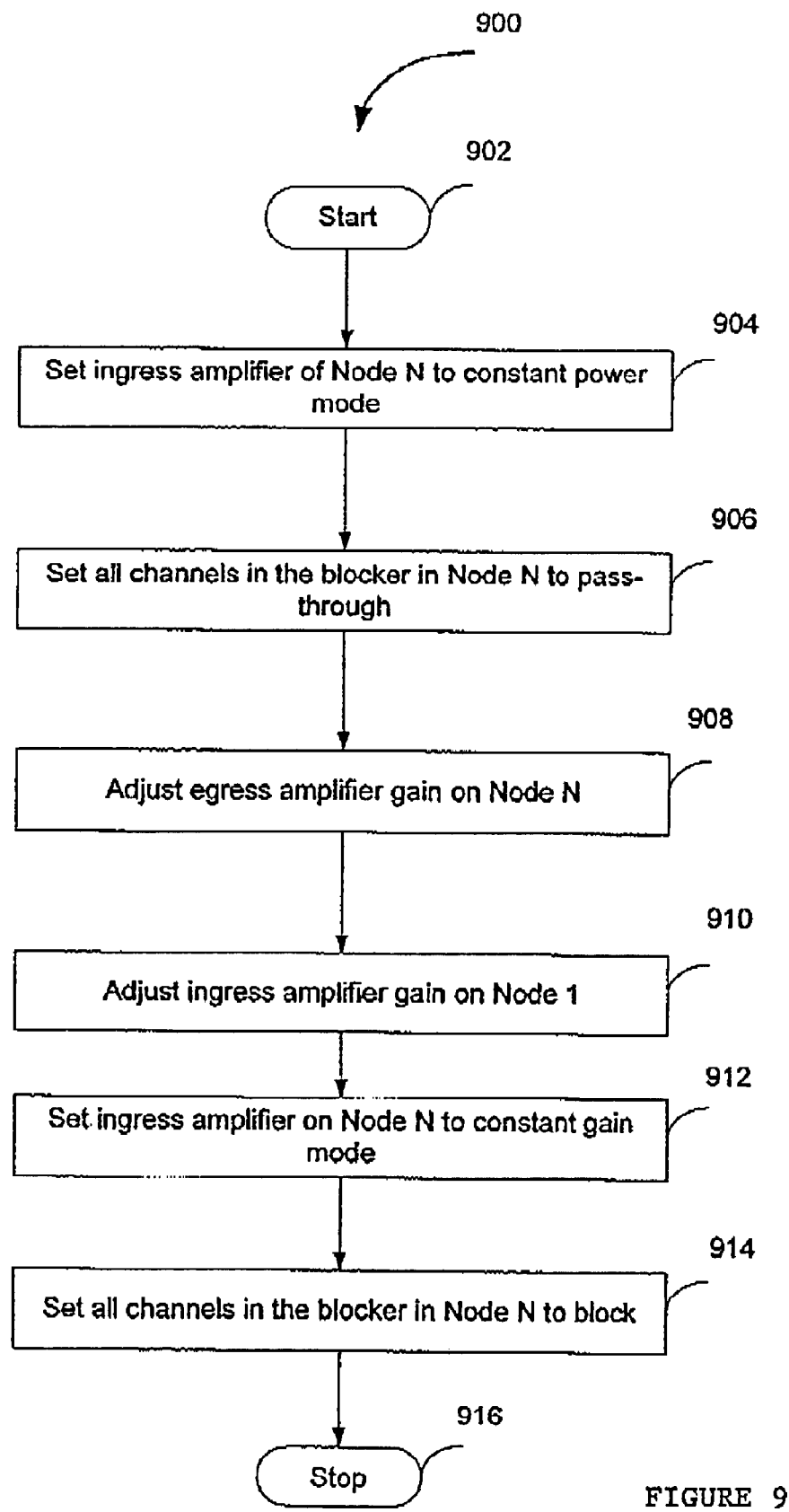
FIG. 9 presents a flowchart for explaining step 416 in FIG. 4.

The step of commissioning of Segment N (box 416 of FIG. 4) is explained with the help of flowchart 900 presented in FIG. 9. Upon start (box 902) the procedure sets the ingress amplifier of Node N to the constant power mode (box 904) so that it becomes an ASE source. All the channels in the blocker in the node are then set to pass-through (box 906) such that none of the channels is blocked. The procedure then triggers the egress amplifier adjust of Node N by using DC powers. The gain of this egress amplifier is thus adjusted (box 908). The ingress amplifier adjust is triggered on Node 1 next for adjusting the gain of this ingress amplifier (box 910). As discussed earlier, the triggering of the amplifier adjust step requires the measurement of the associated losses and the setting of the gain of the appropriate amplifier to a value that compensates for these losses. The techniques for correcting the OSNR induced error as well as the Spectral Filtering error are used by the procedure during the loss computations. The ingress amplifier of Node N is set to the constant gain mode (box 912). The procedure then sets all channels in the blocker in Node N to block (box 914) and exits (box 916).

Figure 10:
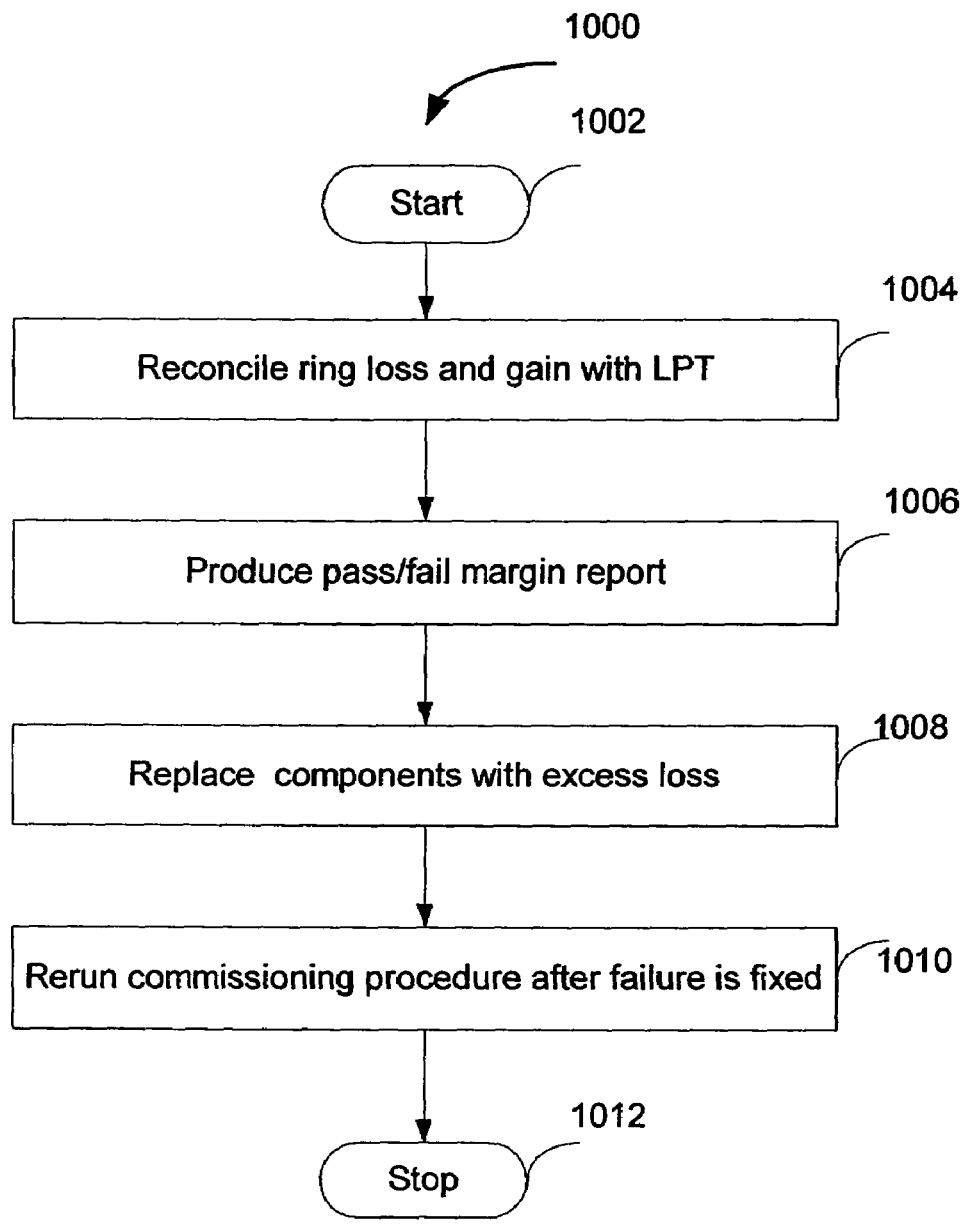
FIG. 10 presents a flowchart for explaining step 418 in FIG. 4.

The step of checking of commissioning of nodes (box 418 of FIG. 4) is explained with the flowchart 1000 shown in FIG. 10. Upon start (box 1002) the procedure reconciles the loss and gain in the entire optical ring network with the LPT (box 1004). It compares the gain/loss produced by each component with the value provided by the LPT. The procedure then produces a pass/fail margin report (box 1006). The report highlights the failed components and how close are their performances to the acceptable worst-case values. The components with excess loss are then replaced (box 1008). The procedure reruns the commissioning procedure for the appropriate segments after a failure is fixed (box 1010) and exits (box 1012).

The method has the following advantages over the existing methods used in prior art, namely:

It provides spectral ripple centering;
It does not require any external sources such as laser sources or additional measurement equipment, which leads to a lower cost and avoids the management of extra equipment;
It gives rise to a faster commissioning time, typically, it gives rise to an order of magnitude reduction in commissioning time in comparison to the manual laser-based prior methods;
It provides loss verification to be performed on a node by node basis; and
It provides a modular segmented approach to network commissioning.

Although the embodiment of the invention has been described with regard to an optical network with a ring architecture, it is contemplated that a similar method with minor variations can be applied to optical networks with other architectures, e.g., mesh networks.

Numerous modifications and variations of the present invention are possible in light of the above teachings. For example, the commissioning method can be made fault tolerant by skipping over segments of the network with faulty components and commissioning the skipped over segments after the faulty components are replaced. It is therefore to be understood that within the scope of the appended claims, the invention may be practiced otherwise than as specifically described herein.

We claim:

1. A method for testing if an optical ring network including nodes operates according to network specifications, the method comprising the steps of:
   verifying a node installation using an internal Amplified Spontaneous Emission (ASE) light source inherently present in the optical network for measuring losses inside the node, and comparing measured losses with losses provided by the network specifications;
   preparing for node commissioning by obtaining target values from the network specifications;
   commissioning nodes using the internal ASE light source for measuring losses inside and between the nodes; and
   checking commissioning of the nodes by reconciling loss and gain of the optical ring network with the network specifications.

2. A method as described in claim 1, wherein the optical ring network contains segments, each segment including two adjacent nodes in said network.

3. A method as described in claim 2, wherein each node includes a demultiplexer, an ingress amplifier, an egress amplifier, a blocker, a coupler and a multiplexer.

4. A method as claimed in claim 3, wherein the step of verifying the node installation comprises the steps of:
   setting the ingress amplifier to constant power mode;
   setting the blocker to pass all channels;
   measuring DC losses between cards in said node;
   comparing measured losses with losses provided by a Link Planning Tool (LPT);
   setting the blocker to pass one channel at a time; and
   verifying per channel control.

5. A method as claimed in claim 3, wherein the step of commissioning nodes comprises the steps of:
   commissioning Segment 1;
   commissioning Segment "i"; and
   commissioning Segment N;
   wherein the Segment 1 includes Node 1 and Node 2, the Segment "i" includes Node "i" and Node "i+1" and the Segment N includes Node N and Node 1 and "i" is greater than 1 but less than N and is incremented in steps of 1.

6. A method as claimed in claim 3, wherein the step of checking commissioning of nodes comprises the steps of:
   reconciling a ring loss and a gain with the LPT;
   producing a pass/fail margin report;
   replacing a faulty component with an excess loss; and
   rerunning commissioning procedure after failure is fixed.

7. A method as claimed in claim 4, wherein the step of preparing for node commissioning comprises the steps of:
   setting all blockers to block;
   downloading LPT target values; and
   setting the ingress amplifiers and the egress amplifiers at a minimum gain specified in the LPT.

8. A method as claimed in claim 4, wherein the blocker is a Reconfigurable Optical Add Drop Multiplexer (ROADM) configured to be a blocker.

9. A method as claimed in claim 5, wherein the step of commissioning the Segment 1 further comprises the steps of:
  setting the ingress amplifier of Node 1 to constant power mode for making
  said ingress amplifier the ASE light source;
  setting all channels in the blocker in Node 1 to pass-through;
  adjusting gain of the egress amplifier on Node 1;
  adjusting gain of the ingress amplifier on Node 2;
  setting the ingress amplifier on Node 1 to a constant gain mode; and
  setting all channels in the blocker in Node 1 to block.

10. A method as claimed in claim 5, wherein the step of commissioning the Segment "i" further comprises the steps of:
  setting the ingress amplifier of Node "i" to constant power mode for making said ingress amplifier the ASE light source;
  setting all channels in the blocker in Node "i" to pass-through;
  adjusting gain of the egress amplifier on Node "i";
  adjusting gain of the ingress amplifier on Node "i+1" that is next to Node "i" in the optical ring network;
  setting the ingress amplifier on Node "i" to constant gain mode; and
  setting all channels in the blocker in Node "i" to block.

11. A method as claimed in claim 5, wherein the step of commissioning the Segment N further comprises the steps of:
  setting the ingress amplifier of Node N to constant power mode for making the said ingress amplifier the ASE light source;
  setting all channels in the blocker in Node N to pass-through;
  adjusting gain of the egress amplifier on Node N;
  adjusting gain of the ingress amplifier on Node 1;
  setting the ingress amplifier on Node N to constant gain mode; and
  setting all channels in the blocker in Node N to block.

12. A method as claimed in claim 9, wherein the step of adjusting the gain of the egress amplifier on Node 1 further comprises the step of measuring associated losses and setting the gain of the egress amplifier on Node 1 to a value that compensates for these losses.

13. A method as claimed in claim 9, wherein the step of adjusting the gain of the ingress amplifier on Node 2 further comprises the step of measuring associated losses and setting the gain of the ingress amplifier on Node 2 to a value that compensates for these losses.

14. A method as claimed in claim 10, wherein the step of adjusting the gain of the egress amplifier on Node "i" further comprises the step of measuring associated losses and setting the gain of the egress amplifier on Node "i" to a value that compensates for these losses.

15. A method as claimed in claim 10, wherein the step of adjusting the gain of the ingress amplifier on Node "i+1" further comprises the step of measuring associated losses and setting the gain of the ingress amplifier on node next to Node "i" on the optical ring network to a value that compensates for these losses.

16. A method as claimed in claim 11, wherein the step of adjusting the gain of the egress amplifier on Node N further comprises the step of measuring associated losses and setting the gain of the egress amplifier on Node N to a value that compensates for these losses.

17. A method as claimed in claim 11, wherein the step of adjusting the gain of the ingress amplifier on Node 1 further comprises the step of measuring associated losses and setting the gain of the ingress amplifier on Node 1 to a value that compensates for these losses.

18. A method as claimed in claim 12, wherein the step of measuring associated losses and setting the gain of the egress amplifier on Node 1 further comprises the step of correcting the OSNR (Optical Signal to Noise Ratio) induced error as well as a Spectral Filtering error.

19. A method as claimed in claim 13, wherein the step of measuring associated losses and setting the gain of the ingress amplifier on Node 2 further comprises the step of correcting the OSNR (Optical Signal to Noise Ratio) induced error as well as the Spectral Filtering error.

20. A method as claimed in claim 14, wherein the step of measuring associated losses and setting the gain of the egress amplifier on Node "i" further comprises the step of correcting the OSNR (Optical Signal to Noise Ratio) induced error as well as the Spectral Filtering error.

21. A method as claimed in claim 15, wherein the step of measuring associated losses and setting the gain of the ingress amplifier on Node "i+1" on the optical ring network further comprises the step of correcting the OSNR (Optical Signal to Noise Ratio) induced error as well as the Spectral Filtering error.

22. A method as claimed in claim 16, wherein the step of measuring associated losses and setting the gain of the egress amplifier on Node N further comprises the step of correcting the OSNR (Optical Signal to Noise Ratio) induced error as well as the Spectral Filtering error.

23. A method as claimed in claim 17, wherein the step of measuring associated losses and setting the gain of the ingress amplifier on Node 1 further comprises the step of correcting the OSNR (Optical Signal to Noise Ratio) induced error as well as the Spectral Filtering error.

* * * * *